United States Patent [19]

Steensen et al.

[11] 3,943,265

[45] Mar. 9, 1976

[54] GELATIN DESSERT COMPOSITION AND PROCESS

[75] Inventors: Wayne L. Steensen, Newark; Joseph J. Saladini, Dover, both of Del.

[73] Assignee: General Foods Corporation, White Plains, N.Y.

[22] Filed: June 10, 1974

[21] Appl. No.: 478,121

[52] U.S. Cl. ............................................. 426/576
[51] Int. Cl.² ............................................. A23L 1/06
[58] Field of Search ............................ 426/168, 350

[56] References Cited
UNITED STATES PATENTS

| | | | |
|---|---|---|---|
| 2,819,970 | 1/1958 | Steigmann | 426/168 |
| 3,018,181 | 1/1962 | Corben et al. | 426/168 |

FOREIGN PATENTS OR APPLICATIONS

| | | | |
|---|---|---|---|
| 545,701 | 9/1957 | Canada | 426/168 |

*Primary Examiner*—Jeanette M. Hunter
*Attorney, Agent, or Firm*—Thomas V. Sullivan; Bruno P. Struzzi

[57] ABSTRACT

A gelatin dessert composition comprises gelatin at critically controlled levels such that the composition, when dissolved in hot water and then quickly chilled with excess ice so as to critically regulate the temperature of the dessert, has a short setting time.

9 Claims, No Drawings

GELATIN DESSERT COMPOSITION AND PROCESS

This invention relates to a gelatin dessert composition which, when dissolved in water, has a short setting time.

Gelatin desserts are usually prepared by dissolving a composition or mix containing gelatin and other ingredients in water and cooling the solution to set it and to cause gelation. Generally, the gelatin dessert mix is dissolved in hot water and the solution placed in a refrigerator for three to four hours for gelation. Because of the long period of time required for gelation to occur with conventional gelatin dessert compositions, an improved gelatin dessert composition which would set and form a gel within a short period of time has heretofore been regarded as a desirable objective.

Many attempts have been made to shorten the setting time required for gelatin desserts. Perhaps the most successful to these involves the use of an "ice cube" technique as disclosed in U.S. Pat. No. 2,785,072. This procedure involves dissolving a gelatin dessert composition or mix in one-half the required amount of water at a temperature of 212° F and then adding water in the form of ice. The melting of the ice provides the additional quantity of water required and, at the same time, rapidly cools the solution to refrigerator temperatures. Although such procedure provides a considerable reduction in setting time — to a period as short as 20 to 30 minutes-further reduction is very desirable from the standpoint of convenience inasmuch as this shorter setting time is achieved by allowing the dessert to set further at refrigerator temperatures.

Also, it has long been known that the use of increased amounts of gelatin in a gelatin dessert composition substantially decreases the time required for a gelatin dessert to set. This procedure, however, has the shortcoming that the resulting gel, particularly after a period of standing, is much stronger than desired and becomes tough and rubbery. Such phenomenon is frequently referred to as "maturation."

Yet, as disclosed in U.S. Pat. No. 2,915,402, the time required for the formation of a gelatin gel can substantially be decreased through the use of an increased amount of gelatin as aforementioned without the disadvantage of the gel maturing or becoming tough and rubbery by employing a proteolytic enzyme in combination with an increased amount of gelatin. However, the presence of such enzyme not only adds further to the cost of the gelatin dessert composition and packaging but also it may break down the gel unless the dessert is prepared with an exacting recipe and is maintained under refrigerated storage conditions.

It is an object of the present invention to decrease the time required for a gelatin dessert to set to as little as five minutes at room temperature.

It is a further object of the present invention to shorten the setting time of a gelatin dessert without undue maturation of the gel and premature breakdown of the gel.

It is yet another object of the present invention to provide both a gelatin dessert composition which, when dissolved with water, forms a dessert having a short setting time and a process for preparing such dessert.

It has now been discovered that these objects may be accomplished by both critically controlling the level of gelatin used depending upon the gelation power of the gelatin used and also critically regulating the final temperature of the gelatin dessert by using an excess ice recipe.

Current gelatin dessert products on the market when prepared with recipes calling for employing ice water or ice, are set in about 30 minutes but only after further chilling. There is, insofar as we are aware, no gelatin dessert product on the market that sets to a good eating quality in as little as five minutes without chilling, that is, at room temperature.

Among the many advantages that the gelatin dessert composition of the present invention has is that it allows the consumer or homemaker to prepare a quick-setting gelatin product along with the remainder of the meal and serve it as a salad or dessert at that meal.

Further, a quick-setting or an instant gelatin dessert may be prepared which does not require a proteolytic enzyme to reduce the maturation normally resulting from the increased concentrations of gelatin used.

Moreover, the quick-setting gelatin product can be prepared plain, that is, without ingredients being folded in right before the meal and still be served at that meal as either a salad or dessert. Current products require two to four hours of refrigeration when an ice water or ice cube recipe is not utilized.

Also, right after quick-setting gelatin product starts to thicken, other ingredients such as fruits, vegetables, meats, and the like, can be immediately folded in and will be suspended uniformly throughout the gel. The product is then usually chilled further and is ready to eat in 15 to 30 minutes. This is still well within the time frame of preparation and serving at the mealtime. By contrast, current products on the market require two to three hours of refrigeration before serving when other ingredients are folded in. In addition, most current products call for chilling the gelatin until thickened before folding in any other ingredients since, if the ingredients are folded in too soon, they either float to the surface or sink to the bottom or, if they are folded in too late, the gel is broken and an unappetizing-looking dessert is the result.

In addition, large deep molded salads and desserts can be prepared in about two hours time whereas most of the current products on the market require 5 to 6 hours of refrigeration.

While we do not wish to be bound to any particular theory, it appears that a major reason that a quick-setting gelatin dessert may be realized is because of the unexpected discovery that when a gelatin dessert with optimum levels of gelatin is quickly chilled from a warm or hot solution to a temperature below 50° F (preferably below 45° F and optimally 35° F), inter- and intra-molecular bonding is reduced. As a consequence, maturation as would normally be expected is significantly minimized.

An experiment was designed to determine to what degree was the gelatin maturation reduced through quick chilling. Four samples containing 9.5, 10.5, 11.5, and 12.5 grams of gelatin 210 AOAC (Association of Official Agricultural Chemists) Bloom, were weighed in duplicate. Each sample contained 1.6 grams adipic acid, 0.5 grams fumaric acid and 0.75 grams of sodium citrate buffer and enough sugar (69.7 – 72.7 grams) to bring the package weight to 3 ounces.

One of each of the duplicate samples was prepared according to the process of the present invention. The sample was dissolved in 1 cup (237 ml.) of boiling water. Two cups of ice cubes were added. The sample was stirred until it started to thicken. The excess ice was removed. The bowl plus prepared sample was again weighed and the total weight of water was calculated (boiling water plus dissolved ice). The sample was then placed into the refrigerator and the gel strength measured at prescribed periods.

The other duplicate sample (previously weighed) was dissolved using 1 cup boiling water and 1 cup cold water. The cold (50° F) water was added by weight to make sure that an exact weight of water was in each duplicate sample. The sample was then stirred and placed into the refrigerator next to its counterpart sample. Gel strengths were taken at prescribed periods.

After the experiment was completed, the samples were melted and the final product volumes measured. The results showed that final product volumes were within 2% of each other for duplicate samples.

The results, presented below, showed that:

1. All of the samples prepared according to the invention were soft-set and ready to eat in 3 to 10 minutes.

2. The duplicate samples prepared in the conventional manner (boiling plus cold water) required about 2 hours of refrigeration to obtain an equal gel strength to samples prepared according to the invention in 15 to 20 minutes.

3. Samples prepared according to the conventional recipe after four hours of refrigeration had a higher gel strength or were more mature than samples prepared according to the invention.

4. After 24 hours of refrigeration, duplicate samples prepared in the conventional manner were from 26% to 35% higher in gel strength than samples prepared according to the invention.

5. After 48 hours of refrigeration, duplicate samples prepared in the conventional manner were from 30% to 39% higher in gel strength than samples prepared according to the invention.

TABLE I

Reduced Maturation - Gel Strengths
Ice Cube Versus Conventional Set
42°F Refrigerator

| Sample Number | Grams Gelatin | Recipe | Grams Gel Strength | | | | | | |
|---|---|---|---|---|---|---|---|---|---|
| | | | 15 min. | 30 min. | 1 Hr. | 2 Hrs. | 4 Hrs. | 24 Hrs. | 48 Hrs. |
| 1 - I | 9.5 | Ice Cube | 12.3 | 15.0 | 18.9 | 23.4 | 27.6 | 36.8 | 39.8 |
| 2 - I | 10.5 | Ice Cube | 16.7 | 21.1 | 27.1 | 31.2 | 35.3 | 46.1 | 50.5 |
| 3 - I | 11.5 | Ice Cube | 21.5 | 27.8 | 33.7 | 38.5 | 43.7 | 57.9 | 64.3 |
| 4 - I | 12.5 | Ice Cube | 24.4 | 29.7 | 36.9 | 40.8 | 46.2 | 66.2 | 74.0 |
| 1 - C | 9.5 | Conventional | — | — | — | 17.6 | 30.6 | 46.4 | 53.0 |
| 2 - C | 10.5 | Conventional | — | — | — | 18.5 | 37.9 | 60.4 | 69.9 |
| 3 - C | 11.5 | Conventional | — | — | — | 23.1 | 46.1 | 78.1 | 89.1 |
| 4 - C | 12.5 | Conventional | — | — | — | 25.2 | 50.5 | 84.3 | 96.1 |

It has been determined that a quick-setting gelatin dessert cannot be obtained by increasing the gelatin concentration alone. Similarly, it has been found that a quick-setting gelatin dessert cannot be obtained with a recipe that chills the product during preparation into the 35° to 45° F range if the product does not contain the optimum level of gelatin. The objectives of a quick-setting gelatin dessert which does not become rubbery on extended refrigeration can only be obtained through use of optimum level of gelatin in conjunction with a recipe that chills the product into the optimum temperature range.

Presented below is a table showing the effect of temperature on time to a soft-set when using a gelatin level of 10.5 grams per 3 ounce package of a 215 Bloom AOAC gelatin. The base formulation was 3:1 adipic:fumaric acid sustem buffered to a pH of 3.85 ± 0.10 with sodium citrate. In addition, the table shows the effects of increasing gelatin concentration and of temperatures and their effect on set time. The refrigerator used for the study was maintained at a temperature of 42° F ± 2° F.

TABLE II

Time to Soft-Set
Gelatin Concentration versus Temperature
3:1 Adipic:Fumaric Acid System
Buffered to 3.85 with Sodium Citrate

| Gelatin (215 Bloom AOAC) Level Grams/3 Ounce Package | Temperature (°F) of Product* After Preparation | Time (minutes) to Soft-Set 42°F Refrigerator |
|---|---|---|
| 10.5 | 95 | 90 – 100 |
| 10.5 | 85 | 75 – 90 |
| 10.5 | 75 | 55 – 65 |
| 10.5 | 65 | 40 – 50 |
| 10.5 | 60 | 25 – 35 |
| 10.5 | 55 | 15 – 25 |
| 10.5 | 45 | 6 – 12 |
| 10.5 | 40 | 4 – 8 |
| 10.5 | 65 | 45 – 55 |
| 11.7 | 65 | 40 – 50 |
| 12.4 | 65 | 35 – 45 |
| 14.9 | 65 | 30 – 40** |
| 10.5 | 55 | 15 – 25 |
| 11.7 | 55 | 11 – 15 |
| 12.4 | 55 | 9 – 12 |
| 14.9 | 55 | 7 – 9** |
| 10.5 | 40 | 4 – 8 |
| 11.7 | 40 | 4 – 5 |
| 12.4 | 40 | 4 – 5 |
| 14.9 | 40 | 4 – 5** |

*Samples were dissolved with one cup boiling water. Then, through experimentation, it was discovered what temperature the water in the second cup had to be to obtain a desired product temperature. The lower temperatures were obtained by placing the bowl in an ice-water-salt bath while the samples were stirred.
**Samples with this level of gelatin (14.9 grams) become rubbery on prolonged refrigeration.

In formulating gelatin dessert compositions according to this invention, gelatins in the Bloom range of 195 to 245 grams AOAC are typically employed because of availability and cost. However, both higher Bloom gelatins in the range of 270 to 350 grams AOAC and lower Bloom gelatins in the range of 100 to 150 grams AOAC will work. Thus, the gelatin Bloom can range anywhere from 100 to 350 grams AOAC Bloom. The higher Bloom gelatins require a lower use level to obtain the same set times as their lower Bloom counterparts.

The gelatin used in accordance with the present invention can be derived from any type of commercially prepared gelatin, either alkaline or acid processed from cowhide, pigskin, or ossein. Further, the gelatin may be one having improved solubility such as may be obtained by spray drying, foam mat drying or the like. Better solubility may also be achieved by using fine mesh (such as, for example, less than 50 mesh U.S. Standard) gelatins and dispersibility may be improved by employing dispersants such as emulsifiers, wetting agents and the like. Antifoam agents such as, for example, dimethylpolysiloxane may be incorporated into the gelatin dessert composition.

Presented below are a series of general formulations presenting the gelatin concentration range for several different Bloom gelatins.

EXAMPLE 1

When using a gelatin with a 215 gram AOAC Bloom the following gelatin concentration ranges were found operable in a sugar sweetened system. The formulations were acidified to taste with an adipic:fumaric acid ratio ranging from 3:1 to 9:1 and buffered with sodium citrate into the pH range of 3.70 to 4.10. The evaluation of different color/flavor combinations showed no effect on the set time of the various systems.

| Ingredient | Typical 3 Ounce Formulation Grams/3 Oz. | Percent |
|---|---|---|
| Gelatin — 215 Bloom AOAC | 9.5 – 12.5 | 11.1 – 14.7 |
| Sugar | 73.1 – 67.6 | 86.0 – 79.5 |
| Adipic Acid | 1.5 – 3.0 | 1.7 – 3.5 |
| Fumaric Acid | 0.2 – 0.8 | 0.2 – 0.9 |
| Sodium Citrate | 0.7 – 1.1 | 0.8 – 1.3 |
| Color | To desired color intensity | |
| Flavor | To desired flavor intensity | |
| | 85.049 | 100.000 |

The gel strengths range from a low of 10 grams to a high of 20 grams within 5 minutes when measured directly in the bowl. This corresponds to a soft-set (10 grams gel strength) to a firm set (20 grams gel strength) as measured in a one quart pyrex bowl and compares favorably with samples that would be refrigerated from 2 to 4 hours when prepared according to normal package directions. The optimum level of gelatin appears to be about 10.5 to 11.0 grams per 3 ounce (4 serving) package when using a 215 gram AOAC Bloom gelatin. This level of gelatin produces a gel with a strength taken in the bowl of 16 to 17 grams in 5 minutes and the dessert is considered set, can be spooned and treated similar to a product prepared in the conventional manner which has been refrigerated for 3 to 3½ hours.

Samples containing from 9.0 to approximately 9.5 grams of gelatin in 215 gram AOAC Bloom strength are considered slightly too soft to be cconsidered a quick-setting product. However, these products naturally set to a good edible gel in 15 to 30 minutes of refrigeration.

Samples containing over 12.5 grams of gelatin (215 Bloom AOAC) per 3 ounce package did set when using the recipe outlined in 5 minutes. Samples prepared with over 12.5 grams of gelatin per 3 ounce package became rubbery or too firm when refrigerated for extended periods of time and were considered of poor eating quality. In addition, samples with the higher levels of gelatin started to set too soon and at too high a temperature (50° F or higher). Samples therefore do not yield the desired 2 cups of finished product when using excess ice.

EXAMPLE 2

When using a gelatin with a 320 gram Bloom AOAC for the invention, it was found that the use levels were reduced significantly as compared to a 215 gram Bloom AOAC gelatin. This reduction was in the range of 13 to 18% less gelatin for a 320 gram Bloom AOAC versus the 215 gram Bloom AOAC gelatin when used in the same 3:1 or 9:1 adipic:fumaric acid systems. All formulations were buffered with sodium citrate into the pH range of 3.7 – 4.1.

| Ingredient | Typical 3 Ounce Formulation Grams/3 Ounce | Percent |
|---|---|---|
| Gelatin — 320 Bloom AOAC | 8.2 – 10.3 | 9.6 – 12.1 |
| Sugar | 74.3 – 69.8 | 87.7 – 82.1 |
| Adipic Acid | 1.5 – 3.0 | 1.7 – 3.5 |
| Fumaric Acid | 0.2 – 0.8 | 0.2 – 0.9 |
| Sodium Citrate | 0.7 – 1.1 | 0.8 – 1.3 |
| Color | To desired color intensity | |
| Flavor | To desired flavor intensity | |
| | 85.049 | 100.00 |

EXAMPLE 3

Using a 150 gram Bloom AOAC gelatin required 8 to 14% more gelatin compared to the 215 gram Bloom AOAC gelatin. The same 3:1 or 9:1 adipic:fumaric acid systems were used in conjunction with sodium citrate as a buffering agent. The pH range was 3.7 – 4.1.

| Ingredients | Typical 3 Ounce Formulation Grams/3 Ounce | Percent |
|---|---|---|
| Gelatin — 150 Bloom AOAC | 11.5 – 12.9 | 13.5 – 15.2 |
| Sugar | 71.0 – 67.1 | 83.5 – 78.9 |
| Adipic Acid | 1.5 – 3.0 | 1.7 – 3.5 |
| Fumaric Acid | 0.2 – 0.8 | 0.2 – 0.9 |
| Sodium Citrate | 0.7 – 1.1 | 0.8 – 1.3 |
| Color | To desired color intensity | |
| Flavor | To desired flavor intensity | |
| | 85.049 | 100.000 |

The quick-setting gelatin dessert composition of this invention can be prepared as sugar-free, that is, artificially sweetened, or reduced sugar, that is, low calorie, or high suger products. The only difference in the products is the quantity of gelatin used, the sugar-free products requiring a slightly lower gelatin level than reduced sugar or high sugar products.

The gelatin dessert composition of this invention may contain edible food acids such as fumaric, malic, tartaric citric, adipic, and mixtures. Thus, for example, adipic/fumaric acids at ratios of from 3:1 to 9:1 may be advantageously employed.

It is generally known that the pH of the prepared product has a direct bearing on the amount of gelatin required to obtain a given texture or gel strength in the finished product. Thus, when fumaric and citric acids were utilized and were buffered into the pH range of 3.1 to 3.5 an additional quantity of gelatin was required to maintain the same finished product set rate or gel strength. This averages out at a 7 to 10% increase in gelatin depending on the exact level of acid employed and the resultant prepared product pH.

The gelatin dessert composition of this invention may also contain one or more of the various buffer salts commonly employed in gelatin desserts such as sodium and potassium citrate, phosphates, bi-tartrates and the like. These buffer salts are commonly used to increase the prepared product pH in order to reduce the concentration of gelatin necessary to obtain any desired prepared product gel strength and texture.

In gelatin desserts prepared in the conventional manner (1 cup boiling water and 1 cup cold water), if the gelatin is not quite completely dissolved before the addition of the cold water, the gelatin will continue to dissolve because of the latent heat in the sample. This is because the dessert is still in the 130° F ± 10° F temperature range even after the cold water is added.

In accordance with the present invention, the dessert is quickly chilled to below 50° F (preferably to about 35° F to about 45° F) and there is no latent heat to dissolve any undissolved gelatin.

Presented below are the standard recipes for three ounce (4 servings) and six ounce (8 servings) packages.

Recipes:
1. Three (3) ounce Package (Four ½ cup servings)
   Add 1 cup of boiling water to gelatin dessert composition. Stir until dissolved. Add approximately 2 cups ice cubes. Stir until gelatin begins to thicken — about 1½ to 2 minutes. Remove unmelted ice. Soft-set and ready to eat in 5 minutes or less. For a firmer product, chill. Set and ready to eat in 15 minutes or less.
2. Six (6) Ounce Package (Eight ½ cup servings)
   Add 2 cups boiling water to gelatin dessert composition. Stir until dissolved. Add approximately 4 cups ice cubes. Stir until gelatin begins to thicken — about 1½ to 2 minutes. Remove unmelted ice. Soft-set and ready to eat in 5 minutes or less. For a firmer product, chill. Set and ready to eat in 15 minutes or less.

The recipes were scaled and found to work for both single serving and two serving envelope size products. As the recipes are scaled down, the container used in the preparation may become more critical since it can absorb more heat and less ice is melted in the second step of the recipe.

In any event, however, it has been found that the gelatin concentration in the dessert, following the addition of hot water and ice, generally in excess, and after melting of the ice, should be in the range of from about 1.5 to about 3.0% by weight. Such concentration is obtained by maintaining an amount of gelatin in the gelatin dessert composition of from about 9 to about 15% by weight depending upon the Bloom of the gelatin employed, with lower percentages of higher Bloom gelatins and higher percentages of lower Bloom gelatins being utilized.

We claim:

1. A gelatin dessert composition having a short setting time on dissolving with hot water and ice which, when melted, is equal to or less than the amount of said water comprising gelatin having a Bloom of 100 to 350 grams (AOAC) and in an amount of from about 9 to about 15% by weight of said dessert composition and in an inverse relationship with the Bloom and sufficient to yield a gelatin concentration of from about 1.5 to about 3.0% in the dessert.

2. A gelatin dessert composition as in claim 1 further comprising sweetener, acid and buffer.

3. A gelatin dessert composition as in claim 2 in which said gelatin has a particle size of less than about 50 mesh U.S. Standard.

4. A gelatin dessert composition as in claim 3 further comprising an antifoam agent.

5. A process for preparing a gelatin dessert having a short setting time comprising combining the gelatin dessert composition of claim 1 with hot water, adding ice which, when melted, is in equal to or less than the amount of said hot water and is also sufficient to yield a final gelatin concentration of from about 1.5 to about 3.0% in the dessert thus dissolved with said hot water and said ice, and allowing said dessert to set.

6. A process as in claim 5 in which the temperature of the dessert following adding ice is in the range of from about 35° to about 45° F.

7. A process as in claim 6 in which said hot water is boiling water.

8. A process as in Claim 7 in which said ice is added immediately to said gelatin dessert that is combined with said water.

9. A process as in claim 8 in which ice is added in excess of the amount of said water and unmelted ice is removed from said gelatin dessert before allowing said dessert to set.

* * * * *